(12) United States Patent
Kitagawa et al.

(10) Patent No.: US 9,421,656 B2
(45) Date of Patent: Aug. 23, 2016

(54) WORKPIECE-POSITIONING DEVICE AND WORKPIECE MANUFACTURING METHOD

(75) Inventors: Shin-ichiro Kitagawa, Atsugi (JP); Hiroyuki Nakazawa, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 13/704,106

(22) PCT Filed: Jun. 16, 2011

(86) PCT No.: PCT/JP2011/063803
§ 371 (c)(1),
(2), (4) Date: Dec. 13, 2012

(87) PCT Pub. No.: WO2011/158903
PCT Pub. Date: Dec. 22, 2011

(65) Prior Publication Data
US 2013/0097853 A1 Apr. 25, 2013

(30) Foreign Application Priority Data
Jun. 17, 2010 (JP) .................................. 2010-138052

(51) Int. Cl.
| | |
|---|---|
| *B23Q 3/18* | (2006.01) |
| *H01M 10/04* | (2006.01) |
| *H01M 10/0525* | (2010.01) |
| *B23Q 3/00* | (2006.01) |
| *H01M 10/0585* | (2010.01) |

(Continued)

(52) U.S. Cl.
CPC .. *B23Q 3/18* (2013.01); *B23Q 3/00* (2013.01); *H01M 10/0404* (2013.01); *H01M 10/0413* (2013.01); *H01M 10/0525* (2013.01); *H01M 10/0585* (2013.01); *H01M 2/0212* (2013.01); *H01M 2/10* (2013.01); *H01M 6/40* (2013.01); *Y02E 60/122* (2013.01); *Y02P 70/54* (2015.11); *Y10T 29/49108* (2015.01); *Y10T 29/49998* (2015.01)

(58) Field of Classification Search
CPC .............................. B23Q 3/00; H01M 10/0585
USPC ....................................................... 29/623.1
See application file for complete search history.

(56) References Cited

U.S. PATENT DOCUMENTS 4,543,970 A * 10/1985 Noh et al. ........................ 134/62
6,163,145 A 12/2000 Yamada et al.
(Continued)

FOREIGN PATENT DOCUMENTS

| CN | 1812073 A | 8/2006 |
| JP | 57-33941 A | 2/1982 |

(Continued)

OTHER PUBLICATIONS

Supplementary European Search Report dated May 9, 2014, (5 pgs.).

*Primary Examiner* — Nicholas P D'Aniello
(74) *Attorney, Agent, or Firm* — Foley & Lardner LLP

(57) ABSTRACT

A workpiece-positioning device includes a workpiece holder of holding a workpiece, a workpiece holder up/down mechanism of moving the workpiece holder up and down, and a free pallet movement mechanism of freely moving a pallet parallel to a reference plane to shift the pallet to a position where the workpiece held by the workpiece holder is lowered so that a positioning pin of the pallet is inserted into a positioning hole made in the workpiece.

3 Claims, 7 Drawing Sheets

(51) Int. Cl.
*H01M 2/02* (2006.01)
*H01M 2/10* (2006.01)
*H01M 6/40* (2006.01)

(56) References Cited

U.S. PATENT DOCUMENTS

| | | | |
|---|---|---|---|
| 6,472,098 B1* | 10/2002 | Sawada et al. | 429/163 |
| 2003/0037431 A1* | 2/2003 | Benson et al. | 29/623.1 |
| 2008/0000068 A1* | 1/2008 | Savoy et al. | 29/429 |
| 2008/0070102 A1 | 3/2008 | Watanabe et al. | |
| 2008/0138698 A1 | 6/2008 | Ogami et al. | |

FOREIGN PATENT DOCUMENTS

| | | |
|---|---|---|
| JP | 63-201808 A | 8/1988 |
| JP | 07-312500 A | 11/1995 |
| JP | 2008-269926 A | 11/2008 |
| JP | 2009-246070 A | 10/2009 |
| JP | 4379467 B2 | 10/2009 |
| JP | 2009-277673 A | 11/2009 |
| JP | 4462386 B2 | 2/2010 |
| WO | WO 2007/106910 A2 | 9/2007 |

* cited by examiner

WORKPIECE-POSITIONING DEVICE AND WORKPIECE MANUFACTURING METHOD

TECHNICAL FIELD

The present invention relates to a workpiece-positioning device and a workpiece manufacturing method which utilizes the device.

BACKGROUND ART

A lithium ion secondary battery package includes a specific number of stacked battery cell packs each incorporating a battery cell (single cell) that are accommodated in a housing. Inside the housing, the battery cell packs are electrically connected in series or in parallel with one another. Specifically, the battery cell packs are connected in series or in parallel by spot-welding electrode tabs of the individual battery cell packs. Desired power performance is obtained by connecting the battery cell packs in this way.

As the electrode tabs are connected as mentioned above, there exist electrode tabs which should be spot-welded as well as electrode tabs which should not be spot-welded. Thus, according to Japanese Patent No. 4462386-B2, electrode tabs of battery cell packs are initially formed in a large size and subsequently cut into specific shapes so that only particular ones of the electrode tabs can be connected.

SUMMARY OF INVENTION

Meanwhile, individual battery cell packs are so soft that poor productivity will result if the battery cell packs are grasped in each successive manufacturing process. Thus, in a battery manufacturing factory, each battery cell pack is placed on a pallet and transferred to each successive process. One of such processes is a process for cutting electrode tabs. This process requires high cutting accuracy because the electrode tabs must be cut to an exact shape. To achieve the high cutting accuracy of the electrode tabs, it is necessary to position the battery cell pack with high precision relative to the pallet and further position the pallet with high precision relative to factory facilities. Moreover, since the battery cell pack is so soft as mentioned above, it has been difficult to exactly position the battery cell pack relative to the pallet. Furthermore, taking into consideration large-scale production to be undertaken, it is necessary to accomplish such positioning in a short time.

Japanese Patent No. 4462386-B2 is not meant to be applied to large-scale production, and there has been a need for a technique suitable for large-scale production.

The present invention has been made in light of the aforementioned problems of the prior art. Accordingly, it is an object of the present invention to provide a workpiece-positioning device and a workpiece manufacturing method that utilizes the device which can position a workpiece (battery cell pack) and a pallet at exact relative positions without the need to waste cycle time.

According to one mode of the present invention, a workpiece-positioning device including a workpiece holder of holding a workpiece and a workpiece holder up/down mechanism of moving the workpiece holder up and down is provided, the workpiece-positioning device further including a free pallet movement mechanism of freely moving a pallet parallel to a reference plane to shift the pallet to a position where the workpiece held by the workpiece holder is lowered so that a positioning pin of the pallet is inserted into a positioning hole made in the workpiece.

An embodiment of the invention and advantages thereof will be described in detail hereinbelow in conjunction with the accompanying drawings.

DESCRIPTION OF EMBODIMENTS

Embodiment

Figure 1A:
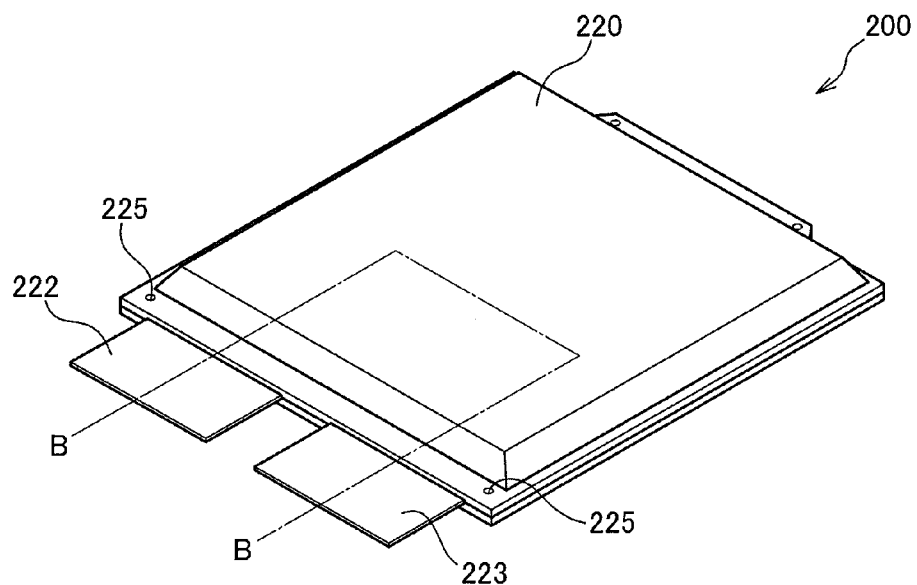
FIGS. 1A and 1B are explanatory representations of the internal structure of a lithium ion secondary battery cell pack.
Figure 1B:
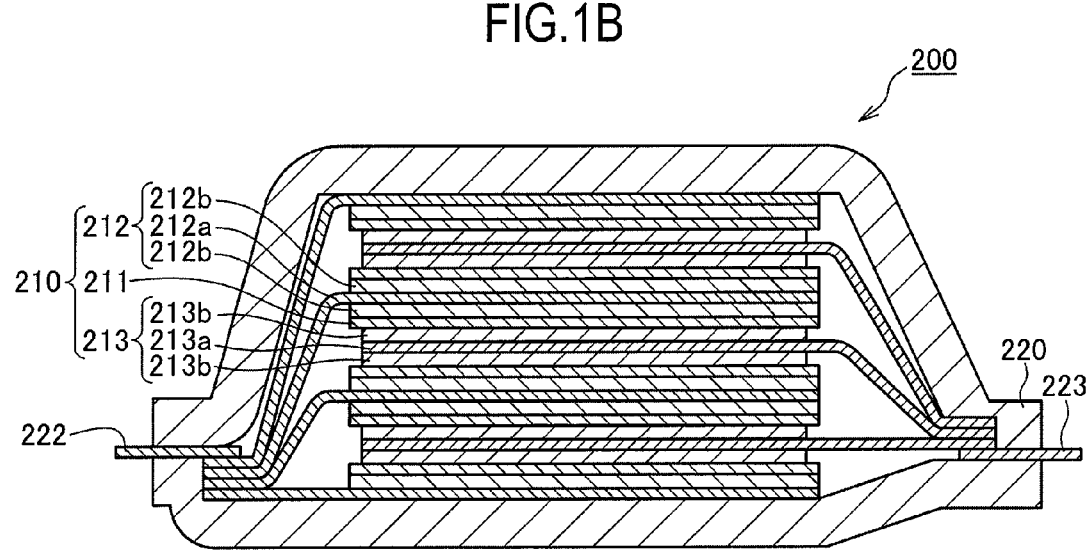

FIGS. 1A and 1B are explanatory representations of the internal structure of a lithium ion secondary battery cell pack, wherein FIG. 1A is a perspective view and FIG. 1B is a cross-sectional view taken along lines B-B of FIG. 1A. Note that each part is deformed.

To facilitate understanding of the present invention, the lithium ion secondary battery cell pack is first described.

The lithium ion secondary battery cell pack 200 includes a specific number of stacked unit batteries 210 which are electrically connected in parallel and an outer pack 220. Although not illustrated, a prescribed number of lithium ion secondary battery cell packs 200 are stacked and accommodated in a box (housing) made of aluminum, for example, to form a lithium ion secondary battery package.

Each of the unit batteries 210 includes a separator 211, a positive electrode 212 and a negative electrode 213.

The separator 211 is an electrolytic layer.

The positive electrode 212 includes a thin, sheet-like positive electrode collector 212a and positive electrode layers 212b which are formed on both sides of the positive electrode collector 212a. Meanwhile, in the positive electrode 212 located in an outermost layer, the positive electrode layer 212b is formed on only one side of the positive electrode collector 212a. Individual positive electrode collectors 212a are joined together and electrically connected in parallel, as if forming a single assembly. In FIG. 1B, the individual positive electrode collectors 212a are joined on a left side, forming a single assembly. This portion where the individual positive electrode collectors 212a are collected constitutes a positive electrode collector portion.

The negative electrode 213 includes a thin, sheet-like negative electrode collector 213a and negative electrode layers 213b which are formed on both sides of the negative electrode collector 213a. Meanwhile, in the negative electrode 213 located in an outermost layer, the negative electrode layer 213b is formed on only one side of the negative electrode collector 213a. Individual negative electrode collectors 213a are joined together and electrically connected in parallel, as if forming a single assembly. In FIG. 1B, the individual negative electrode collectors 213a are joined on a right side, forming a single assembly. This portion where the individual negative electrode collectors 213a are collected constitutes a negative electrode collector portion.

The outer pack 220 accommodates the stacked unit batteries 210. While various materials are available for making the outer pack 220, one candidate would be a sheet material made of a polymer-metal composite laminate film produced by coating aluminum with a polypropylene film, for example. The outer pack 220 is formed by first heat-sealing three sides thereof with one side left open under conditions where the stacked unit batteries 210 are accommodated in the outer pack 220. Then, after filling the outer pack 220 with an electrolytic solution, the one open side is heat-sealed. The outer pack 220 is provided with a positive electrode tab 222 and a negative electrode tab 223 from which electric power is taken out to the exterior of the unit batteries 210.

One end of the positive electrode tab 222 is connected to the positive electrode collector portion inside the outer pack 220 while the other end of the positive electrode tab 222 extends to the outside of the outer pack 220.

One end of the negative electrode tab 223 is connected to the negative electrode collector portion inside the outer pack 220 while the other end of the negative electrode tab 223 extends to the outside of the outer pack 220.

Figure 2A:
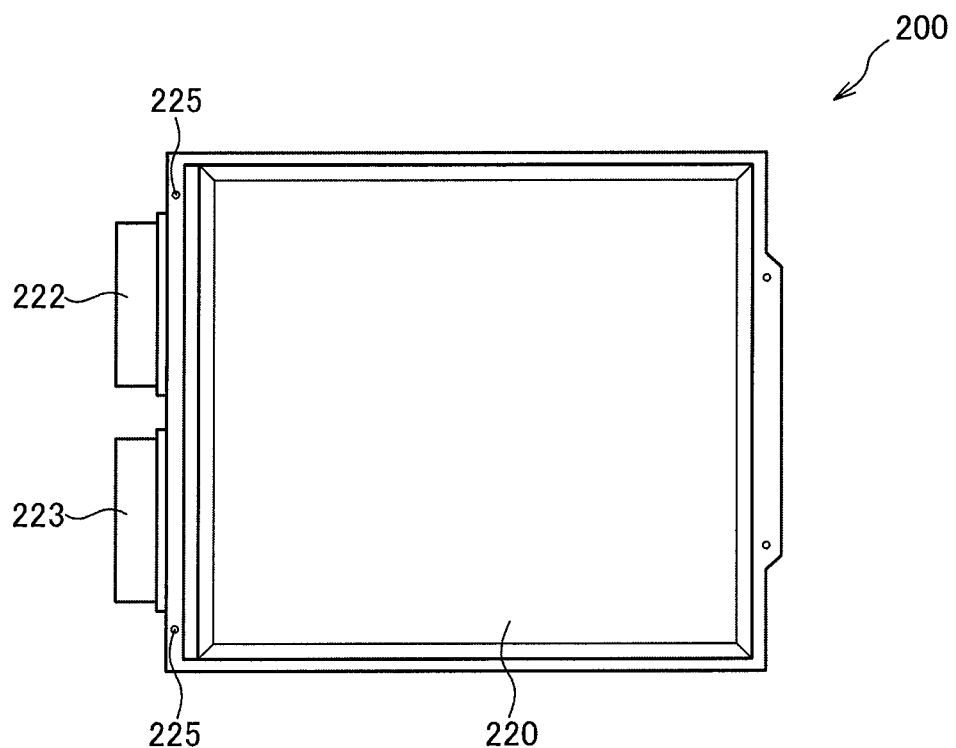
FIGS. 2A and 2B are representations of the external appearance of the lithium ion secondary battery cell pack.
Figure 2B:

FIGS. 2A and 2B are representations of the external appearance of the lithium ion secondary battery cell pack, wherein FIG. 2A is a plan view and FIG. 2B is a side view.

The positive electrode tab 222 and the negative electrode tab 223 stick out from one side (left side as illustrated in FIG. 2A) of the outer pack 220 of the battery cell pack 200. In a heat-sealed portion of the outer pack 220, there are formed positioning holes 225 outside the positive electrode tab 222 and the negative electrode tab 223 (above the positive electrode tab 222 and below the negative electrode tab 223 as illustrated in FIG. 2A).

Figure 3A:
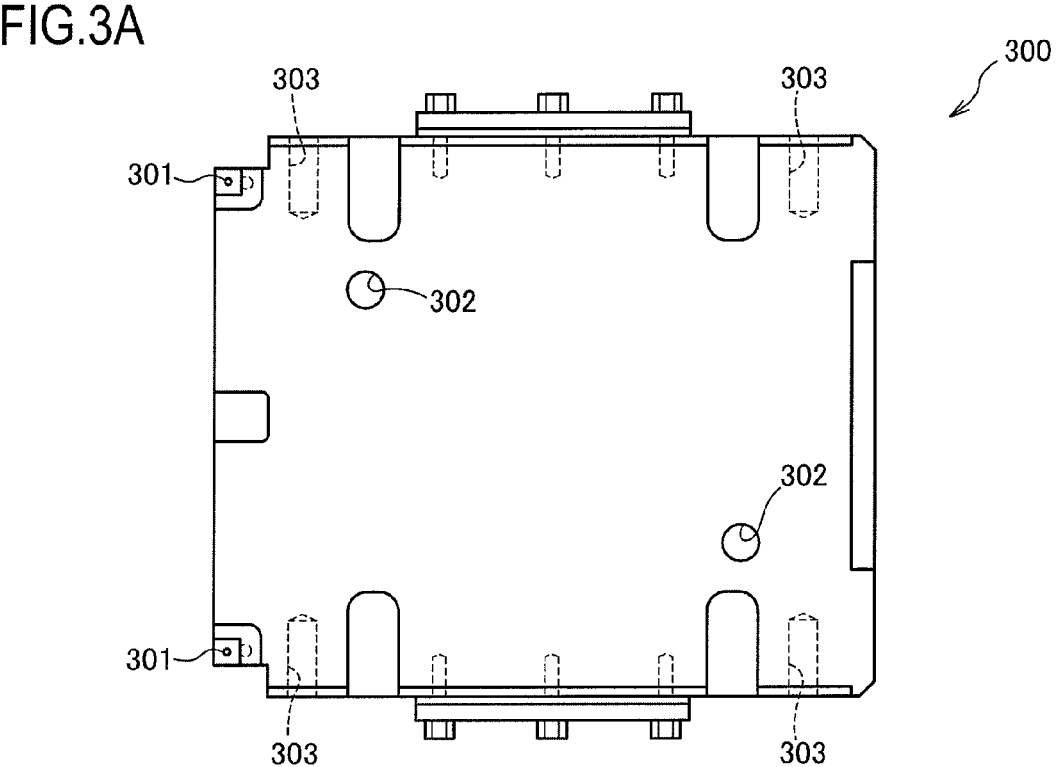
FIGS. 3A-3C are representations of a pallet on which the battery cell pack is placed.
Figure 3B:
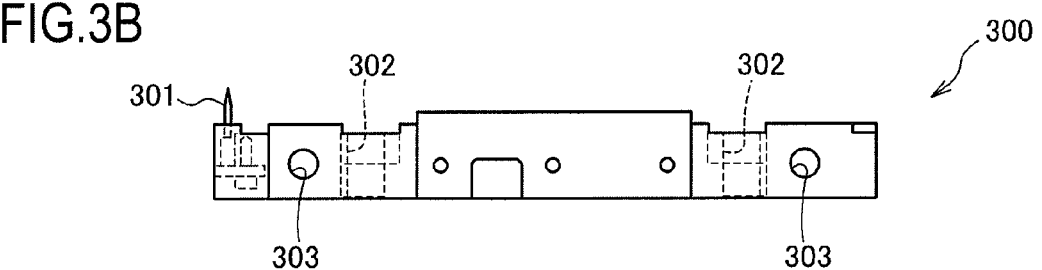
Figure 3C:
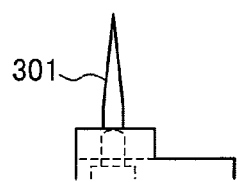

FIGS. 3A-3C are representations of a pallet on which the battery cell pack is placed, wherein FIG. 3A is a plan view, FIG. 3B is a side view and FIG. 3C is an enlarged side view of the vicinity of a positioning pin.

The pallet 300 has a generally quadrilateral shape. The pallet 300 is made of resin. Two positioning pins 301 are provided on the pallet 300 at one side thereof (left side as illustrated in FIG. 3A). As can be seen from FIG. 3C, these positioning pins 301 have pointed ends. The diameter of a basal part of each positioning pin 301 coincides with the diameter of each positioning hole 225 made in the battery cell pack 200. Therefore, the battery cell pack 200 can be positioned on the pallet 300 without creating any misalignment of relative positions therebetween when the positioning holes 225 of the battery cell pack 200 are fitted on the positioning pins 301.

Also, there are formed positioning holes 302 in the pallet 300. These positioning holes 302 are fitted on positioning pins provided in each process facility. With this arrangement, the pallet 300 is positioned without creating any positional misalignment with respect to each process facility. Further, there are formed holes 303 in side surfaces of the pallet 300. As depicted in FIG. 3A, four holes 303 are formed. The pallet 300 is moved with claws of a robot arm inserted into these four holes 303.

As mentioned above, the battery cell pack 200 is positioned on the pallet 300 without creating any misalignment of relative positions therebetween when the positioning holes 225 of the battery cell pack 200 are fitted on the positioning pins 301. By the way, the positioning holes 225 of the battery cell pack 200 are formed in the outer pack 220 which is formed with a sheet material made of a polymer-metal composite laminate film. The outer pack 220 thus produced is so soft that there is a risk that the positioning holes 225 may become enlarged, deformed or ripped if an excessive external force is applied unnecessarily. Also, pins projecting from an insulative spacer for preventing a short circuit between the electrode tabs of the individual battery cell packs that are stacked are inserted into the positioning holes 225 formed in the battery cell pack 200 in a succeeding process. This means that the positioning holes 225 are also used for mutual positioning of the insulative spacer and the battery cell pack 200. Therefore, it is necessary to prevent deformation or the like of the positioning holes 225 (refer to Japanese Patent No. 4379467-B2).

The inventors of the present application have found through strenuous studies that it is possible to position a workpiece (battery cell pack 200) and a pallet at exact relative positions without enlarging, deforming or ripping the outer pack 220 (the positioning holes 225) and without the need to waste cycle time if the battery cell pack 200 is lowered so that the positioning holes 225 fit on the positioning pins 301 of the pallet 300 under conditions where the pallet 300 is freely movable parallel to a reference plane, or under conditions where the pallet 300 is lifted, for example. A specific structure for realizing such an idea of the inventors is described hereunder.

Figure 4A:
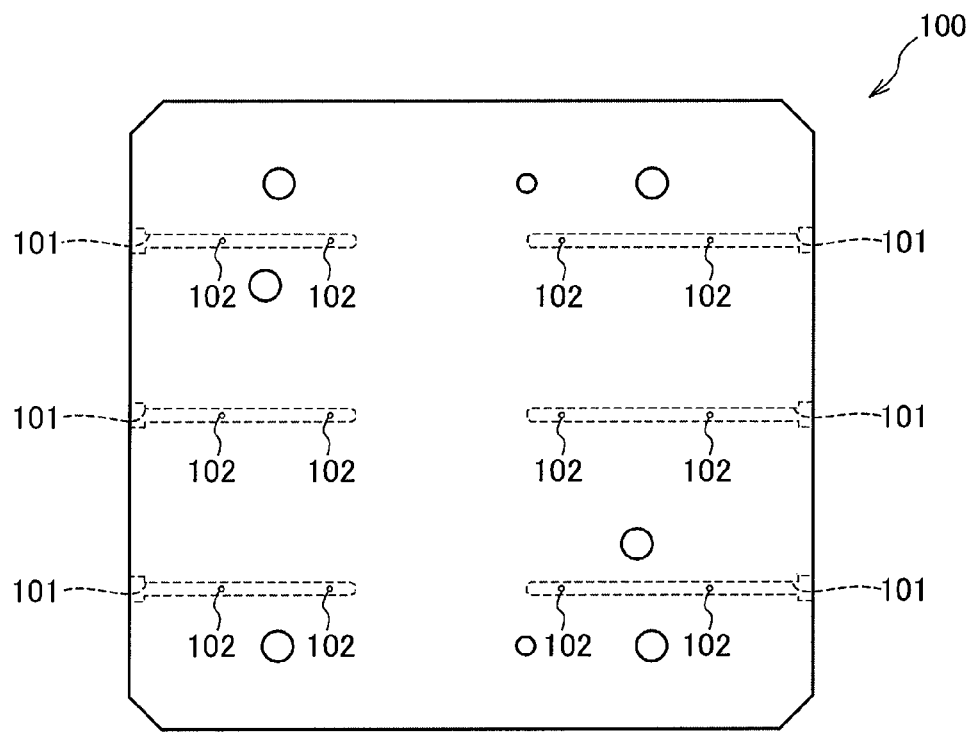
FIGS. 4A and 4B are representations of a platform used in one embodiment of a workpiece-positioning device according to the present invention.
Figure 4B:
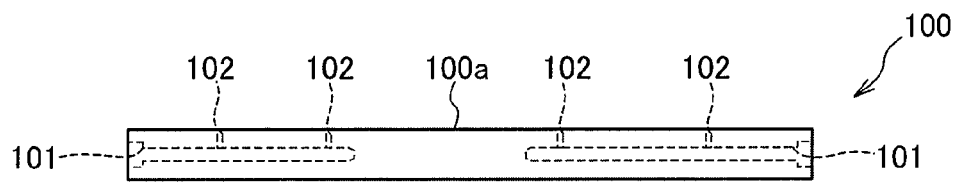

FIGS. 4A and 4B are representations of a platform used in one embodiment of a workpiece-positioning device according to the present invention, wherein FIG. 4A is a plan view and FIG. 4B is a vertical cross-sectional view.

Such a workpiece-positioning device is now described hereunder.

Air feeding channels 101 and air ejecting channels 102 are formed in a platform 100 of the workpiece-positioning device for placing the pallet 300.

The air feeding channels 101 have openings in side surfaces and air supplied from an air supply facility flows through the air feeding channels 101. As depicted in FIGS. 4A and 4B, six air feeding channels 101 are formed.

The air ejecting channels 102 connect to the air feeding channels 101 and have openings in an upper surface 100a. The air which has flowed from the air feeding channels 101 flows into the air ejecting channels 102 and is forced out upward therefrom. As depicted in FIGS. 4A and 4B, there are provided two air ejecting channels 102 for each air feeding channel 101. Meanwhile, the air ejecting channels 102 have a smaller diameter than that of the air feeding channels 101. Therefore, the air flows at a higher speed through the air ejecting channels 102 than through the air feeding channels 101.

Figure 5:
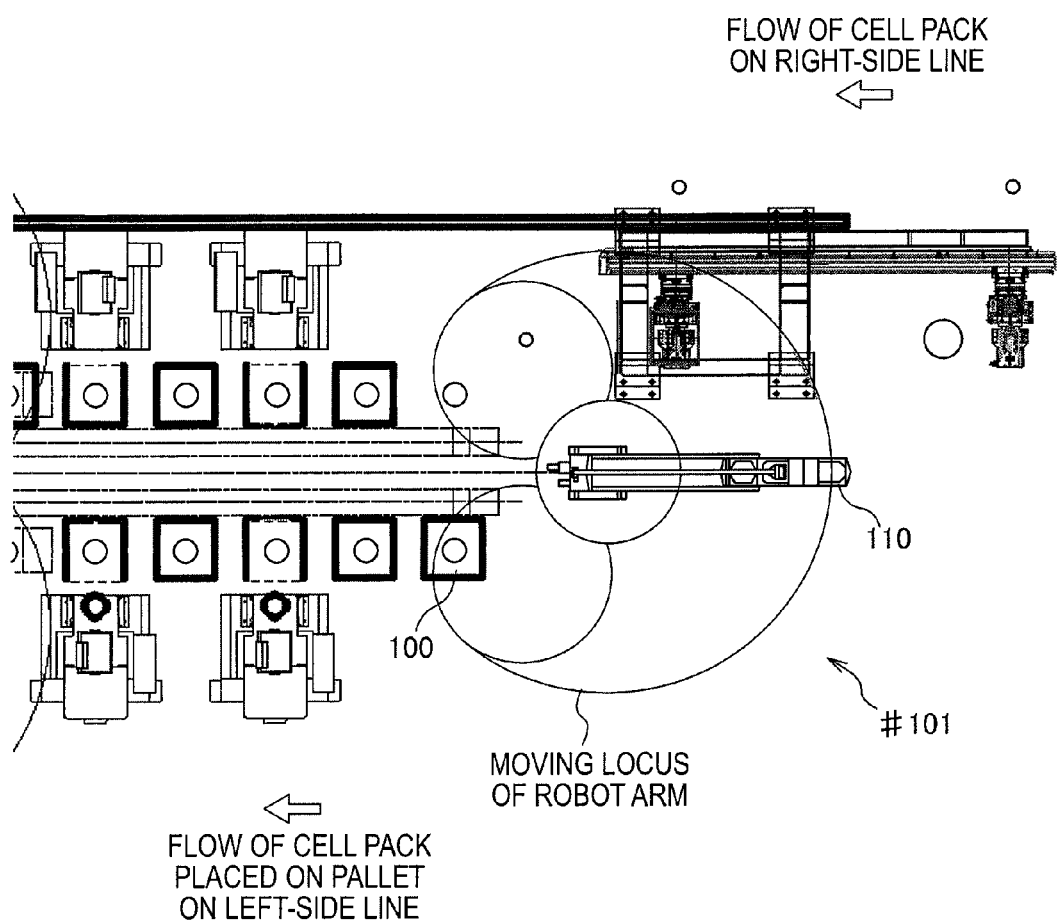
FIG. 5 is a plan view of a production line using the workpiece-positioning device according to the invention.

FIG. 5 is a plan view of a production line using the workpiece-positioning device of the present invention. A right side and left side (as illustrated) of this production line are upstream and downstream sides thereof, respectively.

The battery cell pack 200 manufactured in an upstream process flows along a production line upstream of a robot arm 110 and is held by suction by the robot arm 110 (holding process #101). The robot arm 110 turns along its own moving path to transfer the battery cell pack 200 onto a left-side production line. The pallet 300 is placed on the platform 100 on this left-side production line.

Figure 6:
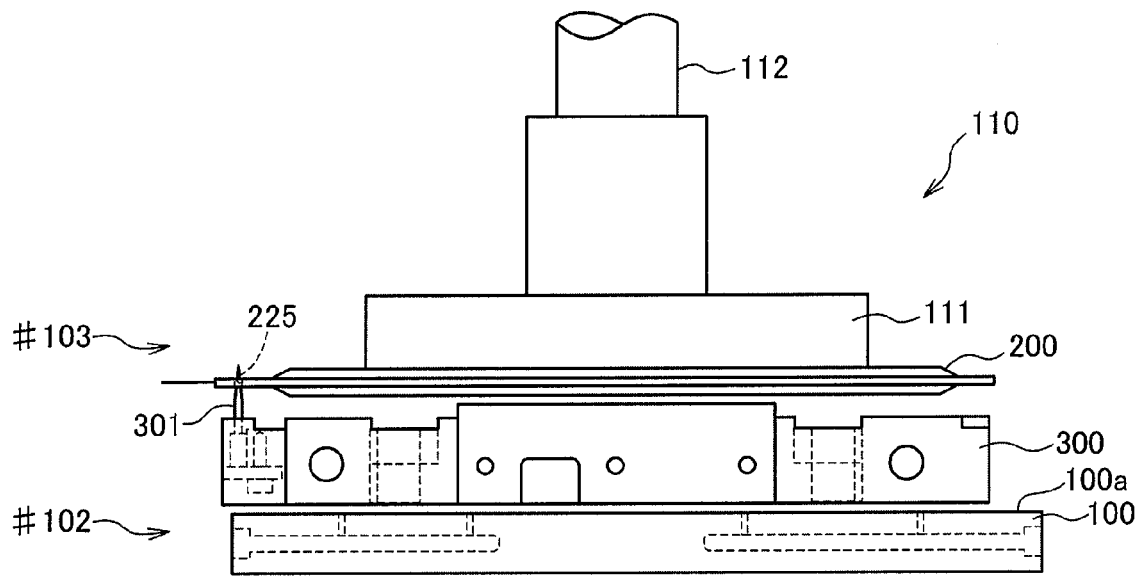
FIG. 6 is a side view for explaining operation of the workpiece-positioning device according to the present invention.

FIG. 6 is a side view for explaining operation of the workpiece-positioning device according to the present invention.

The robot arm 110 includes a workpiece holder 111 for suction-holding the battery cell pack 200 and a workpiece holder up/down mechanism 112 for moving the workpiece holder 111 up and down.

When the robot arm 110 moves down, air is spewed out of the platform 100. This causes the pallet 300 to rise slightly so that the pallet 300 can be freely moved parallel to the reference plane (i.e., the upper surface 100a of the platform 100) (free pallet movement process #102). Then, under conditions where the pallet 300 is slightly lifted, the robot arm 110 descends to place the battery cell pack 200 down on the pallet 300. At this time, the positioning holes 225 of the battery cell pack 200 fit on the positioning pins 301 of the pallet 300 (lowering process #103). Since the pallet 300 is lifted above the platform 100 at this time, the pallet 300 moves to a position where the battery cell pack 200 is located. Therefore, the outer pack 220 (the positioning holes 225) is neither ripped nor deformed in any occasions.

Figure 7A:
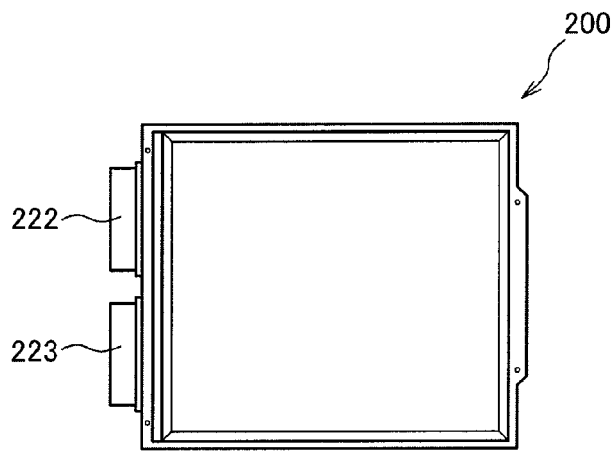
FIGS. 7A, 7B-1 and 7B-2 are explanatory representations of an electrode tab cutting process.
Figures 1, 7B:
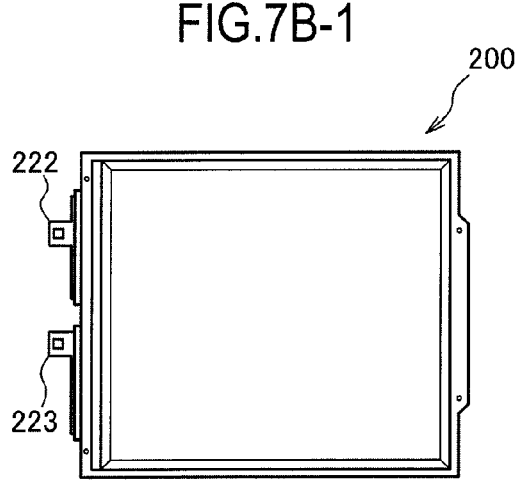
Figures 2, 7B:
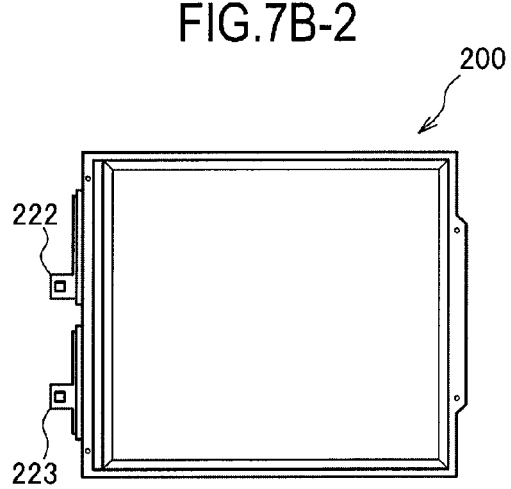

FIGS. 7A, 7B-1 and 7B-2 are explanatory representations of an electrode tab cutting process, wherein FIG. 7A illustrates a situation before cutting, FIG. 7B-1 illustrates one shape of the electrode tabs after cutting, and FIG. 7B-2 illustrates another shape of the electrode tabs after cutting.

On the left-side production line of FIG. 5, the pallet 300 is moved by a robot arm other than the robot arm 110 used for moving the battery cell pack 200 while holding the same by suction. Specifically, the pallet 300 is moved with claws of the robot arm inserted into the holes 303 in the pallet 300. The pallet 300 is placed on a platform of each process facility, wherein the pallet 300 is positioned with the aid of the positioning holes 302. The electrode tabs are cut to a desired shape in this condition as depicted in FIG. 7B-1 or FIG. 7B-2. Incidentally, the shapes of the electrode tabs after the cutting that are depicted in the Figures are simply illustrative and are not limited to these shapes. Also, although only two kinds of shapes are illustrated in FIGS. 7A, 7B-1 and 7B-2, the electrode tabs are cut to more than the two kinds of shapes in accordance with specifications of each battery package.

In a process further downstream, the pins projecting from the insulative spacer are inserted into the positioning holes 225 formed in the battery cell pack 200 to fixedly determine relative positions of the insulative spacer and the battery cell pack 200.

According to the present embodiment, the workpiece (battery cell pack 200) is set in place under conditions where the pallet 300 is lifted by the air forced out of the platform 100. With this arrangement adopted, the pallet 300 moves to a position where the battery cell pack 200 is located when the positioning holes 225 of the battery cell pack 200 fit on the positioning pins 301 of the pallet 300. Therefore, it is possible to keep the battery cell pack 200 from being acted upon by an undesired force, and the outer pack 220 (the positioning holes 225) is neither ripped nor deformed in any occasions. Moreover, there is no need to waste cycle time as the positioning requires a minimal period of time.

It is evident that the present invention is not limited to the above-described embodiment but various modifications and alterations are possible within the scope of the technological concept of the invention and such modifications and alterations are contained in the technical scope thereof.

For example, while the foregoing discussion has presented an illustrative example in which the pallet 300 is lifted from the platform 100 by forcing out the air as a free pallet movement mechanism for freely moving the pallet 300 parallel to the reference plane, the invention is not limited thereto. The pallet 300 may be lifted by utilizing a magnetic repelling force. It is also possible to employ a mechanism in which bearing balls are arranged on the upper surface of the platform 100. Furthermore, it is possible to employ a mechanism in which a film of oil is formed on the upper surface of the platform 100. Moreover, it is possible to employ a mechanism using a water tank containing water to float the pallet 300, instead of using the platform.

Also, while the foregoing discussion has presented an illustrative example in which the battery cell pack 200 is handled as a workpiece, the workpiece may be other than the battery cell pack 200.

The present application claims priority to Japanese Patent Application No. 2010-138052 filed in Japan Patent Office on Jun. 17, 2010. The contents of this application are incorporated herein by reference in their entirety.

The invention claimed is:

1. A workpiece manufacturing method comprising:
   a holding process comprising holding a workpiece via a workpiece holder;
   a free pallet movement process comprising freely moving a pallet separated movably from a platform such that the pallet is parallel to an upper surface of the platform with the pallet being lifted so as to float above the platform; the free pallet movement process comprising spewing air out of the platform to elevate the pallet, and
   a lowering process comprising lowering the workpiece held by the workpiece holder so that a positioning pin of the pallet is inserted into a positioning hole made in the workpiece as the pallet is shifted to a position where the workpiece is located,
   wherein, in the free pallet movement process, the pallet rises from the platform so as to be freely movable parallel to the upper surface of the platform,
   wherein the workpiece is a battery cell pack,
   wherein the battery cell pack comprises at least one unit battery accommodated in a film outer pack,
   wherein the positioning hole is among a plurality of positioning holes in the film outer pack,
   wherein the upper surface of the platform is a reference plane and comprises a plurality of air outlets in the upper surface,
   wherein the platform comprises a plurality of independent air feeding channels formed therein, and
   wherein each of the air feeding channels comprises an air ejecting channel.

2. The workpiece manufacturing method of claim 1, wherein, in the free pallet movement process, spewing the air comprises injecting air so as to lift the pallet.

3. The workpiece manufacturing method of claim 1, wherein, in the lowering process, the workpiece holder holding the workpiece is lowered so as to align the positioning hole of the workpiece and the positioning pin of the pallet.

* * * * *